(12) United States Patent
Jones et al.

(10) Patent No.: US 6,915,732 B2
(45) Date of Patent: Jul. 12, 2005

(54) BREWED ICED TEA OR NON-CARBONATED DRINK DISPENSER

(75) Inventors: Brian C. Jones, New Hartford, CT (US); Sanjay Kumar, Bethel, CT (US); Scott A. Dzibela, Carmel, NY (US); Fernando Ubidia, Ludlow, MA (US); Mark Tauer, Belchertown, MA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 10/402,944

(22) Filed: Apr. 1, 2003

(65) Prior Publication Data

US 2004/0194629 A1 Oct. 7, 2004

(51) Int. Cl.[7] ............................ A47J 31/40; B67D 5/56
(52) U.S. Cl. .................. 99/275; 99/283; 99/289 R; 99/323.3; 222/129.1; 222/146.2
(58) Field of Search ...................... 99/323.3, 275, 99/289 R, 283; 222/129.1, 481.8, 145.5, 146.2; 73/304 R; 346/620

(56) References Cited

U.S. PATENT DOCUMENTS

| | | | |
|---|---|---|---|
| 2,626,785 A | 1/1953 | Lewis et al. | |
| 2,660,351 A | 11/1953 | Thompson | |
| 2,745,334 A | 5/1956 | Schwall | |
| 3,634,107 A | 1/1972 | Cornelius | |
| 3,641,918 A | * 2/1972 | Schellgell et al. | ............ 99/279 |
| 3,790,028 A | 2/1974 | Gardner et al. | |
| 4,300,603 A | 11/1981 | Laub, III | |
| 4,309,939 A | 1/1982 | Stover | |
| 4,470,999 A | * 9/1984 | Carpiac | ............ 426/506 |
| 4,493,249 A | 1/1985 | Stover | |
| 4,575,615 A | 3/1986 | Shigenobu et al. | |
| 4,579,048 A | 4/1986 | Stover | |
| 4,649,809 A | 3/1987 | Kanezashi | |
| 4,682,537 A | 7/1987 | Snowball et al. | |
| 4,773,313 A | 9/1988 | Anson | |
| 4,804,118 A | 2/1989 | Mullen et al. | |
| 4,856,676 A | 8/1989 | Emody | |
| 4,919,041 A | 4/1990 | Miller | |
| 4,920,871 A | 5/1990 | Anson et al. | |
| 4,967,932 A | 11/1990 | Wiley et al. | |
| 5,025,714 A | 6/1991 | Brewer | |
| 5,134,925 A | 8/1992 | Bunn et al. | |
| 5,244,119 A | 9/1993 | Pittman | |
| 5,305,924 A | 4/1994 | Groover et al. | |
| 5,332,123 A | 7/1994 | Färber et al. | |
| 5,332,311 A | 7/1994 | Volk, Jr. et al. | |
| 5,375,508 A | 12/1994 | Knepler et al. | |
| 5,393,540 A | 2/1995 | Bunn et al. | |
| 5,433,349 A | 7/1995 | Romanyszyn, Jr. | |
| 5,465,649 A | 11/1995 | Muis | |
| D369,057 S | 4/1996 | Bradford | |
| 5,524,791 A | 6/1996 | Credle, Jr. et al. | |
| 5,575,405 A | 11/1996 | Stratton et al. | |
| 5,579,678 A | 12/1996 | Goerndt | |
| 5,733,591 A | 3/1998 | Goerndt | |
| 5,773,067 A | 6/1998 | Freychet et al. | |
| 5,865,097 A | 2/1999 | Smit | |
| 5,875,703 A | 3/1999 | Rolfes | |
| 5,899,137 A | 5/1999 | Miller et al. | |
| 5,975,365 A | * 11/1999 | Hsieh | ............ 222/129.4 |
| 5,992,298 A | 11/1999 | Illy et al. | |

(Continued)

Primary Examiner—Reginald L. Alexander
(74) Attorney, Agent, or Firm—Lars S. Johnson; James D. Ryndak

(57) ABSTRACT

A beverage dispensing apparatus includes a mixing chamber for mixing hot water, a beverage concentrate and cold water, as well as one or more additives. The hot water and cold water are supplied at a predetermined flow rate at a predetermined proportion, regardless of the pressure of the water supply. A water heater supplies the hot water within a specified pressure range and without significant entrapped air.

10 Claims, 6 Drawing Sheets

U.S. PATENT DOCUMENTS

| | | |
|---|---|---|
| D417,358 S | 12/1999 | Dutruel |
| D418,000 S | 12/1999 | Mork et al. |
| D419,362 S | 1/2000 | Bouhuys |
| D419,821 S | 2/2000 | Powell et al. |
| 6,082,247 A | 7/2000 | Beaulieu |
| 6,085,637 A | 7/2000 | Fukushima |
| 6,142,063 A | 11/2000 | Beaulieu et al. |
| 6,152,327 A | 11/2000 | Rhine et al. |
| 6,155,158 A | 12/2000 | Anson |
| 6,182,555 B1 | 2/2001 | Scheer et al. |
| 6,240,829 B1 * | 6/2001 | McGarrah .................... 99/275 |
| 6,260,477 B1 | 7/2001 | Tuyls et al. |
| 6,272,973 B1 | 8/2001 | Fukushima et al. |
| 6,279,461 B1 | 8/2001 | Fukushima et al. |
| 6,298,768 B1 | 10/2001 | Fukushima |
| 6,305,268 B1 | 10/2001 | Schamberg et al. |
| 6,387,424 B2 | 5/2002 | Funk |
| 6,393,966 B1 | 5/2002 | Hart et al. |
| 2002/0074350 A1 | 6/2002 | Jones et al. |
| 2002/0104442 A1 | 8/2002 | Maxwell et al. |
| 2002/0129663 A1 | 9/2002 | Hoyt et al. |
| 2002/0129712 A1 | 9/2002 | Westbrook et al. |
| 2003/0003208 A1 | 1/2003 | Lassota |

\* cited by examiner

BREWED ICED TEA OR NON-CARBONATED DRINK DISPENSER

BACKGROUND OF THE INVENTION

1. Field of the Invention

The present invention relates to beverage forming and dispensing systems. More particularly, the present invention relates to beverage forming and dispensing systems for effectively preparing a beverage mixture from concentrate, and even more particularly to beverage forming and dispensing systems for effectively preparing a tea beverage mixture from concentrate.

2. Description of the Related Art

Beverages formed from concentrates are enjoyed around the world. An important advantage of forming a beverage from a concentrate is that only the concentrate need be shipped to the dispensing site; any available water supply at the site can be used to form the bulk of the final mixed product. An advantage in forming traditionally brewed drinks, such as tea and iced tea, from concentrate is that the time-consuming brewing process is eliminated.

There are many types of beverage making machines or appliances for forming beverages from concentrate. For example, U.S. Pat. No. 4,920,871 relates to a beverage making appliance in which hot water is discharged onto a brewing material, such as ground coffee or tea leaves, placed in a filter within a brewing funnel. In making iced tea, a brewed concentrate discharges from the brewing funnel and combines with cold water to form an iced tea stock. However, in this beverage-making appliance, the concentrate must first be brewed and the ratio of the cold water and hot water concentrate is not precisely metered.

U.S. Pat. Nos. 4,309,939 and 4,579,048 relate to beverage brewing apparatuses in which beverage concentrate is first brewed from a dry beverage making material in a funnel. The concentrate is distributed into a reservoir into which cold water is added to dilute the concentrate to an acceptable strength. However, the cold water is supplied to the reservoir after the hot concentrate begins to flow into the reservoir. Accordingly, the cold water and hot concentrate may stratify in the reservoir and not mix sufficiently.

U.S. Pat. No. 5,579,678 relates to an apparatus for automatically sweetening tea in which heated water combines with tea in a brewing station to form tea concentrate where it is mixed in a canister with a delivered sweetener. After sufficient tea concentrate is brewed and delivery of the sweetener is completed, a quantity of diluting water is mixed with the hot tea concentrate and dissolved sweetener. Because the diluting water is supplied after a complete batch of tea concentrate is brewed, the resulting mixture may stratify and not mix sufficiently. It is known to agitate a mixture for prevention of stratification and for more effective mixing. However, more complicated structure and greater power consumption is necessary to effect agitation.

Additionally, conventional leaf tea urns are costly to clean and operate, and are subject to undesirable and even dangerous growth of bacteria inside the urn. The tea itself is a food source for bacteria and the long residence times of tea product in the urn create an environment that promotes bacteria growth. Generally, bacteria colonies start to reproduce within several hours of making a fresh batch of tea. Typical post mix iced tea systems negate the disadvantages of the leaf tea brewing process by directly mixing tea syrup with cold water. However, since there is no brewing step, the finished tea product does not have the same visual and taste quality as real, fresh-brewed iced tea.

From the foregoing, it is apparent that there is still a need for an improved method and apparatus for automatically preparing beverages from concentrate and ensuring that the resulting beverage mixture is sufficiently mixed.

SUMMARY OF THE INVENTION

The present invention can provide a method and apparatus for preparing a beverage from concentrate.

The present invention can also provide a method and apparatus that effectively mix a beverage concentrate and diluting water.

Further, the present invention can provide a method and apparatus that provide a residence time for the mixing of hot water and beverage concentrate.

Still further, the present invention can provide a beverage mixing apparatus which is essentially a post-mix device but which has the appearance of a real brewing urn, such as a leaf tea brewer.

In addition, the present invention can provide a hot water heating unit that can rapidly heat water and dispense it at a relatively low pressure without significant variation of flow rate during dispensing and without significant entrapment of air bubbles.

Moreover, the present invention can provide a beverage mixing apparatus that can maintain a predetermined flow rate and a predetermined proportion of hot and cold water regardless of pressure variations in the water source.

Further, the present invention can provide a beverage mixing apparatus that can reliably mix the various components of the resulting beverage.

These and other aspects, objects, and features of the present invention will become apparent from the following detailed description of the preferred embodiments, read in conjunction with, and reference to, the accompanying drawings.

DETAILED DESCRIPTION OF THE PREFERRED EMBODIMENTS

The present invention relates to a beverage dispensing system that has the appearance of a system dispensing a beverage from a reservoir, but which is actually a post mix dispenser that instantaneously mixes and dispenses concentrate along with hot water and/or cold water.

In particular, the present invention relates to an iced tea dispenser that looks and operates like a real leaf tea brewing urn, but which is actually a post mix dispenser that instantaneously mixes and dispenses tea concentrate, hot water, and cold water. Additives, such as a liquid sweetener and an aroma-enhancing substance, may also be mixed and dispensed with the other elements. The finished tea product looks and tastes like fresh brewed leaf tea, but without the disadvantages of high maintenance, high operational costs, and susceptibility to bacterial growth, which are inherent to leaf tea brewers. Additionally, the exterior of the dispenser appears to the user as a real leaf tea brewing urn.

The disclosure of U.S. Patent Application Publication No. 2002-0074350, published Jun. 20, 2002, is incorporated herein by reference. This publication is based on U.S. patent application Ser. No. 09/965,829, filed Oct. 1, 2001, which is also incorporated herein by reference. In addition, the disclosure of U.S. patent application Ser. No. 10/100,164, filed Mar. 19, 2002, is incorporated hereinto by reference.

Figure 1:
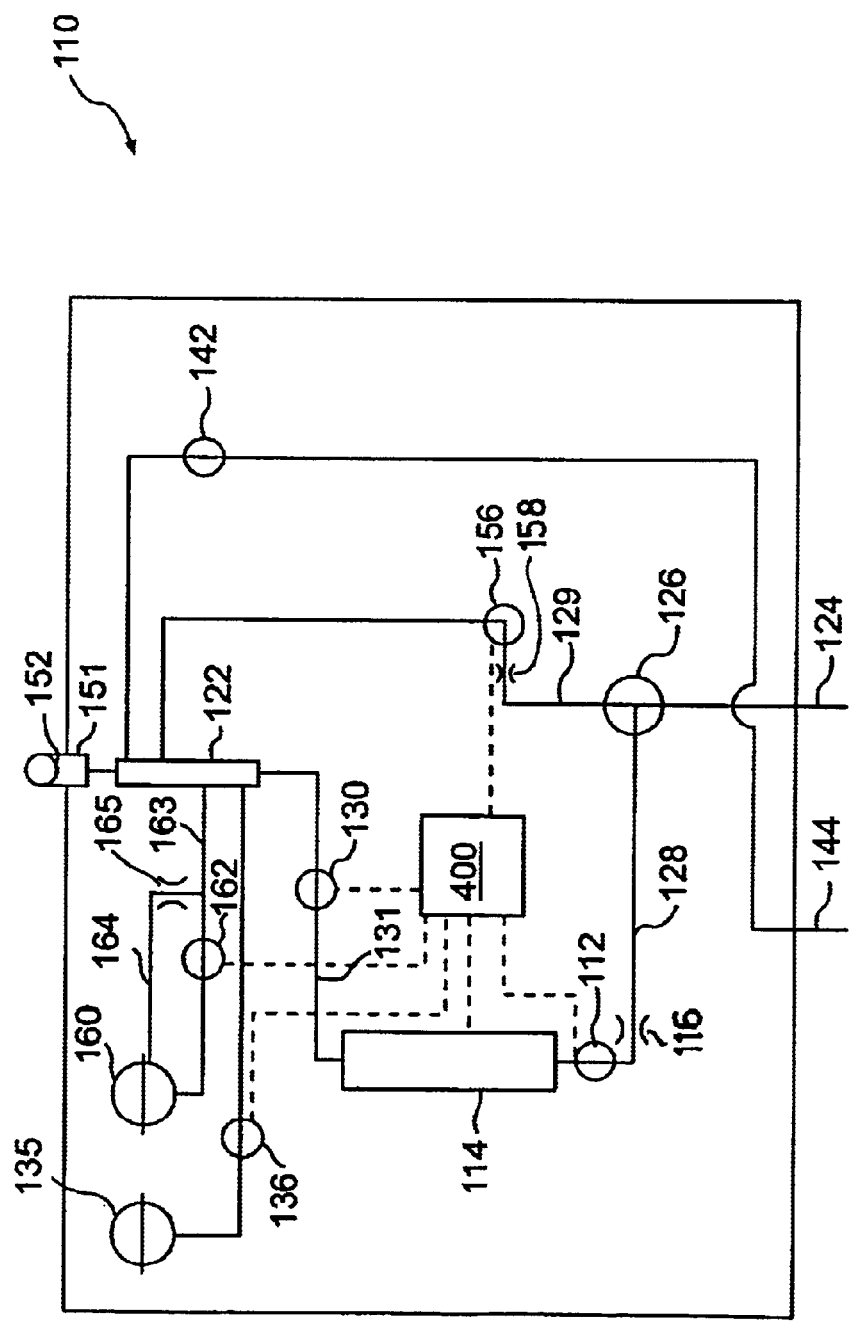
FIG. 1 is a block diagram of a beverage dispensing system according to an embodiment of the present invention.

An embodiment of the present invention will now be described with reference to FIG. 1. Throughout the system, conventional beverage tubing (FDA approved for use with food products) is used to connect the components of the system. Any of the beverage tubing lines may be insulated to prevent heat loss or gain. In the beverage dispenser system 110 shown in FIG. 1, a pressurized water source 124 supplies water to the system 110 at typical domestic water pressures, i.e., approximately 30–50 psi. As with the apparatus disclosed in the embodiments of the prior application, the dispensing apparatus can have the appearance of a real leaf tea brewing urn that dispenses beverage from a reservoir, but is actually a post-mix dispenser that can instantaneously mix and dispense tea concentrate along with hot and cold water. A sweetener and other additives, such as an aroma additive, can also be mixed therein. The correct proportion of hot and cold water can be maintained regardless of the incoming water pressure.

Water from water source 124 is split into two separate flows of hot water inlet line 128 and cold water inlet line 129 at water pressure regulator 126. Alternatively, a separate flow splitter can be positioned downstream of the pressure regulator to separate the flows. The flow through hot water heater inlet line 128 is controlled by a solenoid-operated hot water heater inlet flow control valve 112, which controls the flow of water into water heater 114, which will be described in detail later. Flow of water out of heater 114 through outlet line 131 is controlled by solenoid-operated hot water outlet valve 130. Hot water outlet line 131 is connected to a mix chamber 122 downstream of the valve 130. A solenoid-operated cold water supply valve 156 is provided in cold water supply line 129. The outlet of line 129 is also connected to the mix chamber 122.

Each of valves 112, 130 and 156 can be a conventional plunger valve, movable between fully-opened and fully-closed positions. In addition, each of valves 112 and 156 contains an orifice restriction of a predetermined size to meter the flow of water therethrough. That is, based on the relative sizes of the orifice restrictions of the two valves, the correct proportion of hot and cold water can be maintained regardless of the incoming water pressure at water source 124. This ratio is preset by selecting an appropriate fixed orifice restriction for each valve. After the appropriate orifice restriction is set, the total water flow can be controlled by adjusting water pressure regulator 126. For example, increasing the upstream pressure to the valves increases total flow, while decreasing pressure decreases flow. Alternatively, rather than incorporating the restrictions into the valves, the restrictions can be separate components in the hot and cold water lines. The hot water restriction 116 can be placed anywhere in line 128 between pressure regulator 126 and water heater 114 and the cold water restriction 158 can be placed anywhere in line 129 between the regulator 126 and the mix chamber 122.

Figure 2A:
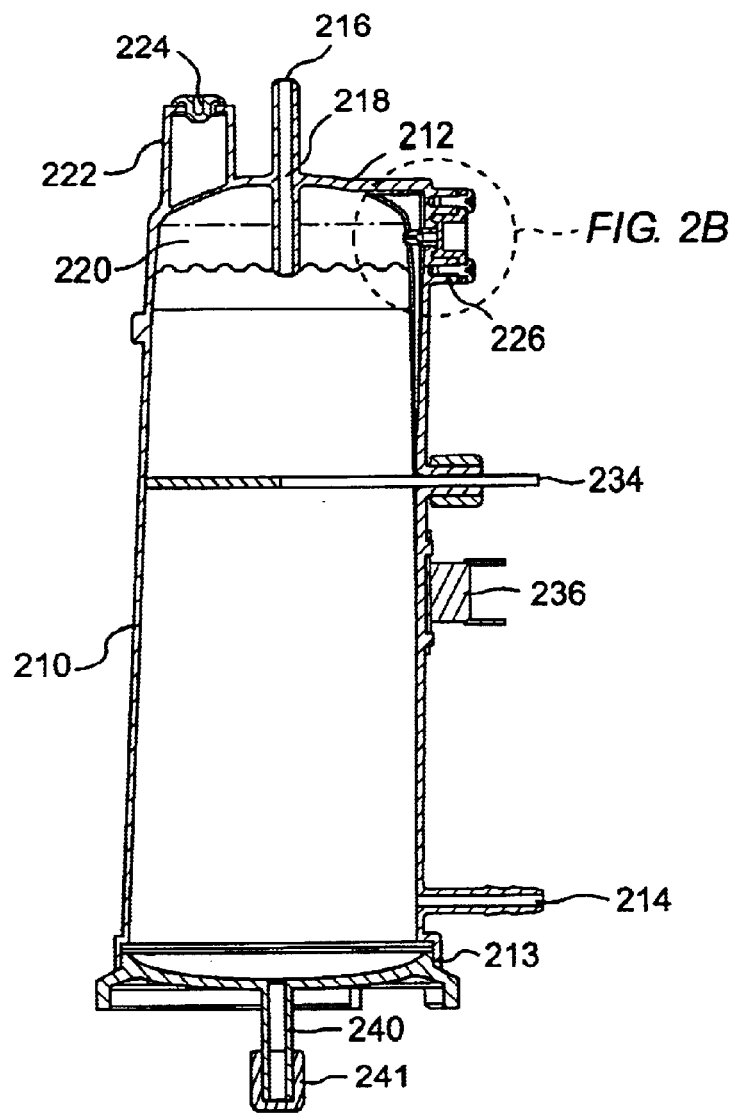
FIG. 2A is a cross-sectional view of the water heater according to the embodiment.
Figure 2B:
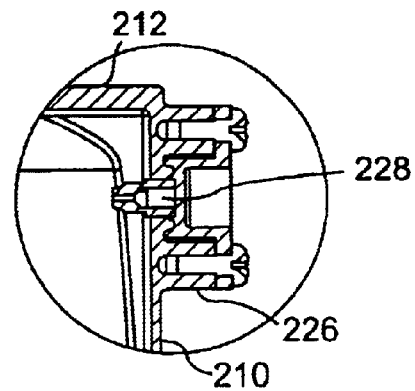
FIG. 2B is a partial enlargement of FIG. 2A.
Figure 3:
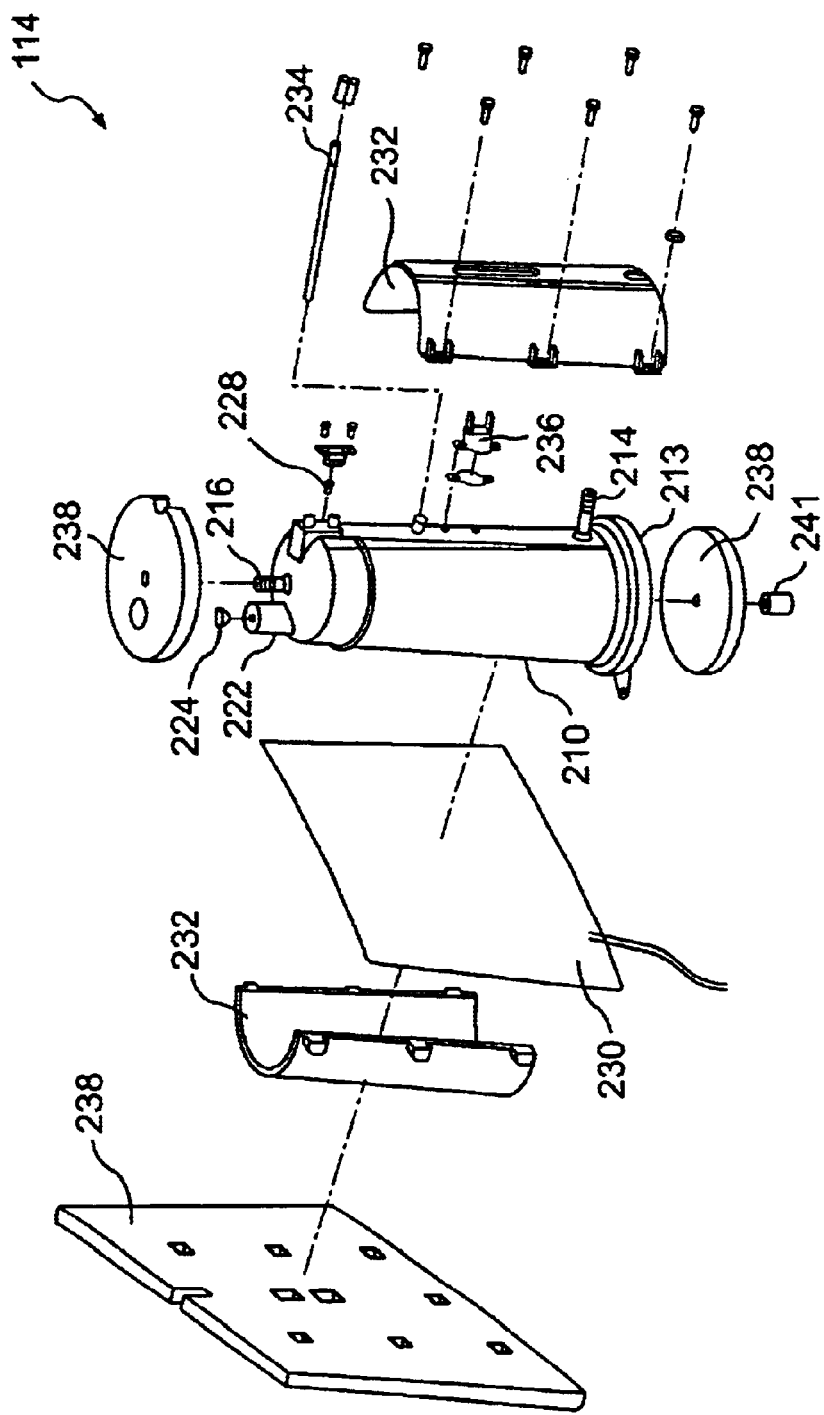
FIG. 3 is an exploded perspective view of the hot water tank.

Referring to FIGS. 2A, 2B and 3, hot water heater 114 will be described in more detail. The hot water heater 114 includes a tank 210 having cylindrical side walls enclosed by a cover 212 and a base 213. Water from hot water supply line 128 is supplied through water inlet 214 provided near the base 213. Hot water exits the tank 210 through a hot water outlet 216 located at cover 212. Located coaxially with and in communication with outlet 216 is a dip tube 218. The dip tube extends downwardly from the interior of cover 212 within the tank. Water exits the interior of tank 210 through an opening at the end of dip tube 218 so that the level of water in the tank should never rise significantly above the bottom end of the dip tube. This creates a head space or air ballast 230 between the water surface and the cover 212 when the tank is filled.

Two check valves are provided in or near cover 212. An atmospheric check valve 224 is provided in an extension or chimney 222 extending from the cover 212. Atmospheric check valve 224 acts as a pressure relief valve to set a maximum pressure in the tank and can be adjustable. This valve protects the tank from overpressurization. Hot water outlet valve 130 can be designed as a back-up for this function. A vacuum check valve 228 is provided in flange or collar 226 also connected with the cover 212 at any elevation above the water level. Vacuum check valve 228 prevents negative pressure from generating in the tank when, for example, a substantial amount of cold water flows into the tank, which may cause steam in the head space to condense and otherwise cause a negative pressure. Vacuum check valve 228 allows air from outside of the tank to pass into the head space to equalize the pressure when such negative pressure condition develops. Check valves 224 and 228 communicate with the head space 220 defined by dip tube 218. This head space enables the tank to react to changes in temperature and pressure and maintain desired pressure conditions.

Working together, valves 224 and 228 define a minimum (e.g., atmospheric) and a maximum pressure in the tank. It has been found that when the relief pressure of valve 224 is set relatively high (e.g., 5–7 psig), use of vacuum check valve 228 is not necessary. However, if the relief pressure of valve 224 is relatively low (e.g., 3–4 psig), such a vacuum relief valve may become necessary to prevent the development of negative pressure in the ballast that would otherwise be caused by the rapid entry of cold water or by the heater's own power supply being disconnected. This is because at a relatively high pressure (5–7 psig), a vacuum is typically not created in the head space even when a substantial amount of cold water flows into the tank, but such may readily occur when the relief pressure is set to a lower level (e.g., 3–4 psig).

During the water heating process large amounts of dissolved air become released from solution in the water and can be observed as bubbles rising upward in the tank and collecting in the head space at the top of the tank. A major benefit of relief valve 224, besides maintaining a uniform water pressure in the tank, is to provide a means to remove or "eject" the excess air from solution. If this air were not removed, the air would exit in the flow of hot water from the heater into the mix chamber. If air bubbles enter into the mix chamber, the flow of hot water through the mix chamber would not be uniform. Non-uniform flow of hot water results in varying concentration of tea product in the mix chamber and can be viewed by the user as clear and dark volumes of finished tea product dispensed from the nozzle. The apparatus described in U.S. Patent Application Publication No. 2002-0074350 uses an elaborate air ejection mechanism to remove air and facilitate the uniform flow of hot water to the mix chamber. The present invention provides an improved method of removing air by combining the function of water heating and air ejection into a single water heater assembly as described herein, which provides a uniform back pressure to the mix chamber and removal of all the air that becomes disassociated from the water as the water is heated. The net result is a simplified and economical approach to provide uniform flow of hot water to the mix chamber that results in superior product homogeneity.

When the hot water control valves 112 and 130 are closed and the water heating unit heats the water, the pressure in the head space may rise to the maximum release pressure. When the hot water control valves are open, hot water will be forced through the mix chamber at a higher than desired flow rate due to the pressure in the head space. However, this pressure quickly dissipates and the hot water flow quickly reaches a steady state at a desired supply pressure of about 1 psig maintained in the head space. The steady state pressure supply can give the appearance of gravity-fed dispensing as in a conventional brewing urn.

Tank 210 is heated by a low watt density or low power density heater blanket 230 which is fitted tight to the tank 210 and encapsulated by a shell 232. The shell can be in the form of two semi-cylindrical halves that can be bolted together at their edges to encapsulate the heater blanket 230. The compression of heater blanket 230 by shell 232 improves thermal transfer between the heater blanket and the water contained inside the tank. The low watt density of the blanket, typically less than 3 watts per square inch, reduces the temperature of the inside surface of the tank as compared to conventional immersion heaters with much higher watt densities, e.g., greater than 100 watts per square inch. The lower surface temperature improves heater efficiency and reduces the precipitation of mineral scale onto heat transfer surfaces that can result in reduced operating life of the heater. Scale formation creates a resistance to heat transfer and over time can increase heater temperature to the point that the electric resistance elements in the heater blanket will fail.

A primary water temperature sensor 234 formed of an encapsulated temperature sensing element such as a thermocouple or thermistor is provided in contact with the water in the tank 210 to measure its temperature. A controller 400 will supply energy to heater blanket 230 to heat the water in the tank until it reaches a predetermined temperature as measured by water temperature sensor 234. A tank temperature sensor 236 such as a bi-metallic thermostat element is provided in contact with the exterior surface of tank 210 to measure its temperature. If the temperature of the exterior of the tank rises above a predetermined level, the thermostat 236 is used to break the supply of energy (i.e., supply voltage) to the heater blanket 230 to prevent overheating. The thermostat is thus a redundant control to prevent overheating in the event of a failure of the primary temperature sensor 234.

To further increase heating efficiency, tank 210 can be covered with insulation 238. Insulation is provided around the side walls as well as top and base of the tank. A drain 240 is provided at the lowest point of tank 210 and is normally closed by an end stop 241. In the event of long periods of non-use, the tank can be drained completely through drain 240.

The tank 210 produces hot water within a predetermined range. The hot water is preferably in the range of 140–200° F., more preferably in the range of 175–185° F., and most preferably is 180° F. A temperature that is too high may cause the water to boil over. Additionally, during high volume dispensing, the temperature may drop. While this lower temperature produces a product of lesser quality, it is still sufficient to produce the mixed beverage. The hot water inlet flow control valve 112 controls the flow rate of water into the tank 210. The incoming water enters the tank 210 at a controlled flow rate and pushes heated water out of the tank at the same flow rate. A preferred volume of the tank is a relatively small, 0.75–1.5 liters, which facilitates rapid heating of the water. The low-pressure operation of the tank, without wide variation in pressure, contributes to a uniform flow of end product, causing the dispensed product to appear to be flowing from a reservoir, such as from a real leaf tea brewing urn.

When the controller 400 supplies voltage to the heating blanket to heat the water in the tank, both inlet and outlet hot water valves 112 and 130 are normally closed as long as the system is in a non-dispensing mode. Outlet hot water valve 130 is necessary to isolate the tank during the heating cycle to contain the expansion of water in the tank as the water is heated. If valve 130 did not exist or were opened during the heating cycle, hot water would expand and rise up the dip tube 218 and enter into the mix chamber. This overflow of hot water into the mix chamber would result in greatly diluted tea product during the initiation of the normal dispensing function, and would be experienced as clear hot water flowing from the nozzle. Generally, hot water valves 112 and 130 will operate simultaneously during the normal product dispensing function to provide instantaneous and uniform hot water flow to the mix chamber.

Referring again to FIG. 1, in the mixing chamber 122, a concentrate is mixed with hot water and cold water. The concentrate can be supplied through a fitment 135 and pumped by a gear pump 136. Gear pump 136 can be DC-powered and can provide practically pulseless concentrate delivery for better homogeneity. The flow capacity of the concentrate can be adjusted by varying the DC voltage supply or via pulse width modulation, which modulates pump speed.

The beverage concentrate can be of any concentration ratio, with the mixing ratios of concentrate, hot water, and cold water being adjusted according to the specific concentration ratio. In a preferred embodiment, the beverage concentrate is nominally a 100:1 dilution ratio based on volume, allowing storage of the highly concentrated beverage within a relatively small space. The beverage concentrate can be supplied in a disposable plastic bag. Since the concentrate can be costly, it is beneficial to be able to fully evacuate the plastic bag with little or no remnant, which requires proper support of the plastic bag within the system. One method is to support the plastic bag via a conventional "bag-in-box" approach. The preferred method is to hang the plastic bag from hooks (not shown) attached to a support structure (not shown) of the system, which results in a more complete evacuation of the concentrate from the plastic bag.

In order to activate certain flavor components and to effectively mix and dissolve the concentrate, this extraction should be mixed with hot water at a temperature in a range of around 175–185° F. At lower temperatures, the mixture may not remain in solution. In the preferred embodiment, the concentrate is first mixed with hot water in the mixing chamber at a ratio of about 10:1 and the hot water/concentrate mixture is then mixed with cold water at a ratio of about 9:1 further downstream in the mixing chamber. Thus, the resulting beverage mixture will have a constituent ratio of cold water, hot water and concentrate of about 90:10:1.

A substance for adding aroma to the dispensed mixture can also be supplied to the mix chamber. This aroma substance can be provided through a fitment 160 and also pumped by a DC-powered gear pump 162. The aroma substance is very concentrated and supplied or injected at extremely low dosage, for example, on the order of 8 grams per minute. Typical gear pumps normally do not operate at such a low discharge rate. Accordingly, a return line 164 is positioned to establish fluid communication between a discharge line 163 of pump 162 and fitment 160. A variable restriction 165 is provided in return line 164. By varying restriction 165, a precise amount of aroma substance can be returned back to the source while allowing a fraction of the substance discharged by the pump to enter the mix chamber. Alternatively, the flow rate of aroma can be further restricted by placing an additional flow restriction at the aroma inlet to the mix chamber. In addition, another additive, such as a sweetener can be selectively supplied through a separate line 144 to the mix chamber. The sweetener can be controlled by a solenoid valve 142.

Pressure switches can be used to monitor the supplies of the concentrate, aroma substance, and sweetener to determine when the supplies of these various components are depleted.

Figure 4:
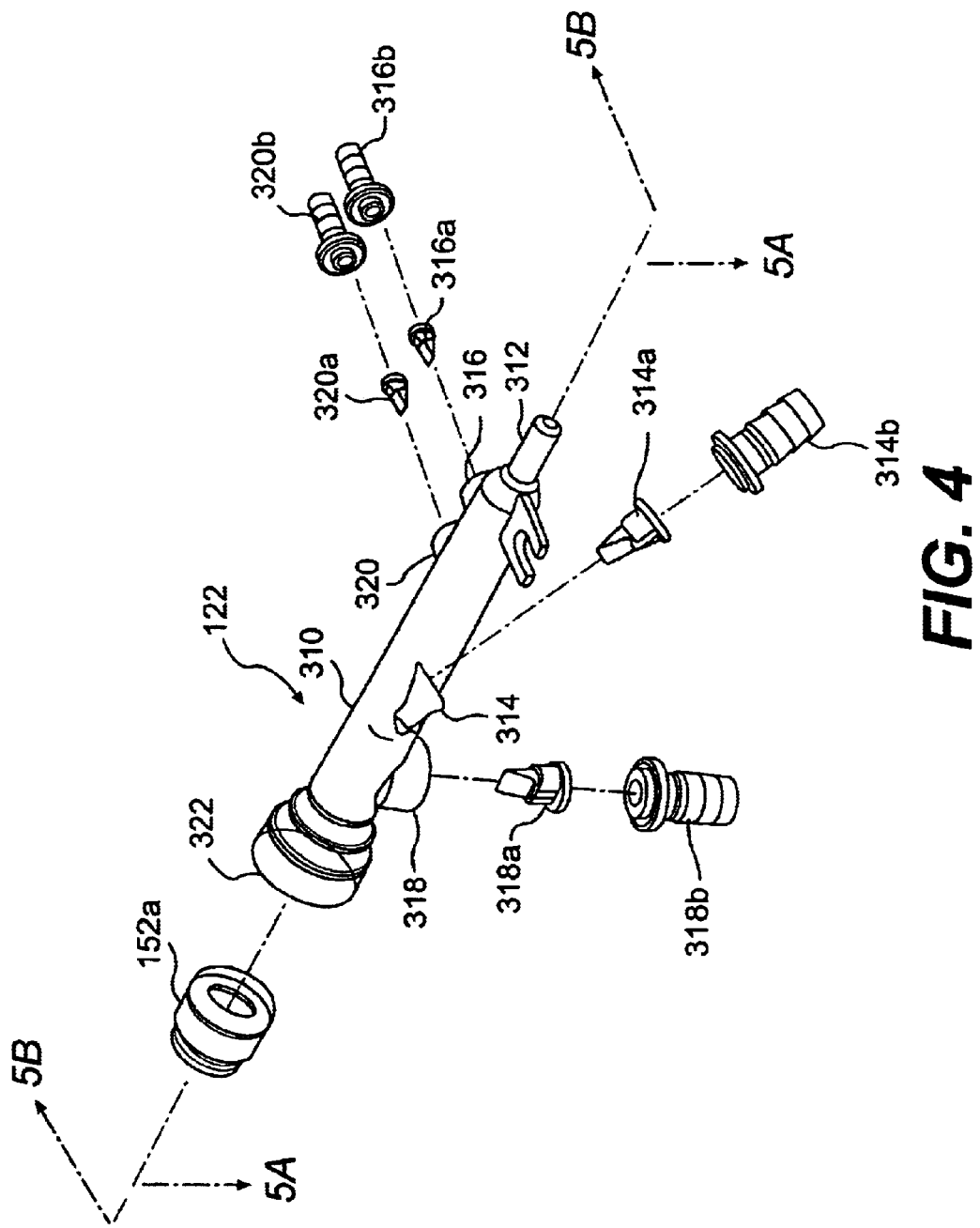
FIG. 4 is an exploded perspective view of the mix chamber of the embodiment.
Figure 5A:
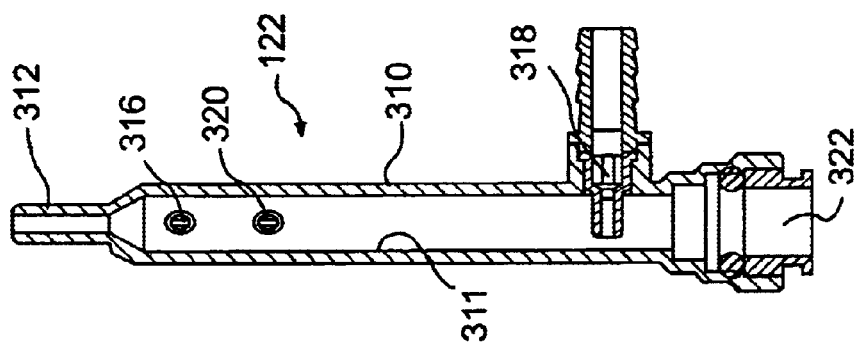
FIG. 5A is a cross-sectional view of FIG. 4 taken along section line 5A—5A.
Figure 5B:
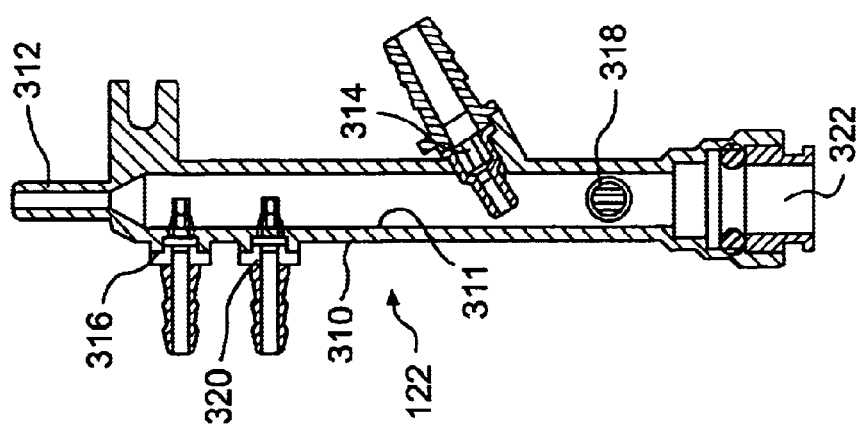
FIG. 5B is a cross-sectional view of FIG. 4 taken along section line 5B—5B.

A more detailed description of the mix chamber 122 will be described with reference to FIGS. 4, 5A and 5B. The mix chamber includes a cylindrical housing 310 with a central bore 311 and various supply ports 312, 314, 316, 318 and 320, as well as a discharge exit 322. Hot water is supplied through an axial inlet 312 that is provided coaxially with the central bore 311 of housing 310. Downstream of axial hot water inlet 312 is cold water inlet 314. Cold water inlet 314 is disposed at an angle transverse to the axis of the housing and preferably at an angle less than 90°. The cold water inlet port 314 is preferably angled in the flow direction, as shown in FIG. 4, to help maintain uniform flow. A concentrate inlet 316 is disposed between hot water inlet 312 and cold water inlet 314. Inlet 320 is provided between concentrate inlet 316 and cold water inlet 314 and can supply the aroma substance. Inlet 318 is provided downstream of the cold water inlet and can be used to supply an additive such as sweetener. The additive port is preferably located on the bottom of the mixing chamber 122. This positioning allows the additive to stratify during periods of non-dispense. Stratification is possible because the additive has a higher specific gravity than the beverage product. For example, a liquid sweetener has a higher specific gravity than a tea product. It is also desirable to keep the sweetener fully concentrated during periods of non-dispense to maintain the effectiveness of sterilizing agents in the sweetener.

The assignments of the various constituents to particular inlets as well as the positioning of the various inlets are not limited to that described above. However, it is preferred that hot water be supplied at the inlet furthest upstream to enable hot water to rinse the entire mixing chamber in a rinse cycle. Further, it is preferred that the concentrate inlet be disposed adjacent the hot water inlet to enable a residence time of the concentrate with the hot water before the cold water is introduced. This residence time can range from 0.1–2.0 seconds, for example, as desired. A residence time of about 0.5 is desired in one application. That residence time can be controlled by adjusting the flow rate with respect to the distances between the hot water, concentrate and cold water inlets.

The mixing chamber 122 mixes the beverage solution, and it is preferable for the mixing chamber to have a gradually reducing hydraulic diameter from its entrance to its exit. The gradually reducing hydraulic diameter provides additional mixing of the beverage solution. Additionally, the mixing chamber 122 may have internal flow vanes (not shown) on the internal surface of, or inserted into, the mixing chamber to further direct and mix the beverage solution.

At the exit of the mixing chamber 122, the beverage solution empties into the nozzle assembly 151, where the flow direction is changed from horizontal to downward. The change in flow direction further enhances mixing. A converging nozzle 152 is threaded onto the nozzle assembly 151. Flow is directed through the nozzle 152 and into a cup or pitcher of the user. The nozzle 152 may have internal flow vanes (not shown) to help straighten the flow and minimize splashing. It is preferable for the nozzle 152 to be threaded onto the nozzle assembly 151 such that the threads are not exposed to the beverage product, making the system easier to clean.

The mixing chamber 122 of the present invention provides good mixing of the beverage product that produces a homogenous flow with no color variation due to incomplete mixing, and is drainable and cleanable with hot water to reduce the growth of bacteria. It is preferable to mold the mixing chamber assembly, or its components, with an antibacterial agent (for example, Microban™) mixed with plastic resin to discourage the growth of bacteria on the internal and external surfaces.

With the exception of hot water inlet 312, it is preferred that a check valve be provided at or near each of the other supply inlets. Each check valve 314a, 316a, 318a, 320a can be in the form of a duck bill valve. Each valve can be encapsulated within each inlet or within a barb fitting 314b, 316b, 318b, 320b attached to each inlet. Mix chamber 122 can be formed of plastic or stainless steel, for example, and the check valves or barb fittings can be sonically welded or glued to the mix chamber body. The check valves can prevent the back flow of the mixture into the various inlet lines. The exit 322 of the mix chamber 122 can be directly connected to the nozzle assembly 151 or a flange or adapter 152a for connection with the nozzle assembly. Alternatively, the mix chamber can be formed integrally with the nozzle assembly.

In operation, controller 400, which can comprise a microprocessor on a circuit board, activates the associated flow control valves and pumps and starts the dispensing process. Additionally, transformers provide power to the system.

The programmable microprocessor (not shown) provides intelligent control of the system. The microprocessor controls the dispensing function (i.e., valve operation, pump operation, temperature control, etc.), monitors system status such as water temperature, number of drinks dispensed, and out of product sensors (concentrate and additive), can control a daily hot water flush, provides service diagnostics, and provides the ability to remotely poll the electronic status.

Figure 6:
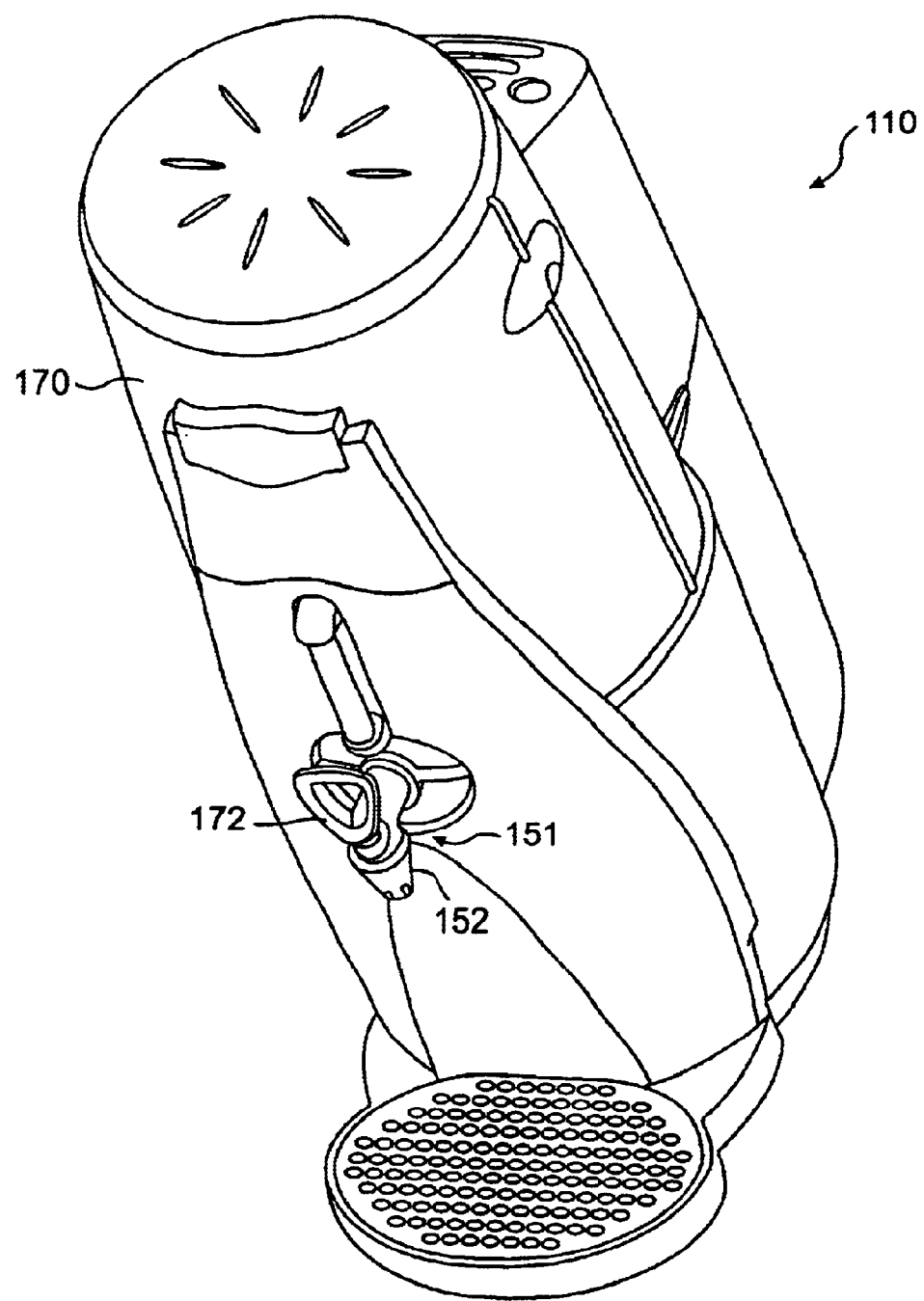
FIG. 6 is a perspective view of the beverage dispensing apparatus of the present invention.

Referring to FIG. 6, the nozzle assembly 151 includes a lever 172, nozzle 152, a microswitch (not shown), and a switch depressor (not shown). The user initiates the flow of beverage product by pulling on the lever 172. The lever 172 is linked to a pull rod that activates the microswitch with the switch depressor. The lever 172 returns to the resting position by a biasing device or spring. The microswitch can be mounted to the rear of the nozzle assembly and is hidden from the user. Closure of the microswitch creates an input to the controller that in turn activates the associated flow control valves and pumps, and starts the dispensing process. Alternatively, the microswitch can directly activate the associated flow control valves and pumps, and start the dispensing process.

If the system is first being used or is being used for the first time in a while, or the tank has been drained for some reason, the system must be initialized. Lever 172 is depressed so as to actuate at least hot water control valves 112, 130. Water is fed through hot water inlet line 128 into the bottom of tank 210 while evacuating air from water outlet 216. This evacuated air is passed through hot water outlet line 131 through the mix chamber 122 and out the nozzle 152. If cold water solenoid valve 156 is opened, the evacuating air will be evident in the discharging cold water. The water level rises in the tank until it reaches dip tube 218, at which time water begins to flow through outlet line 131. A continuous, smooth flow of water through the nozzle will signal the operator that tank 210 is filled. There is no need for a tank level sensor.

In operation, after the water tank has been filled and the water heated, upon lever 172 being operated, the microswitch is activated to control the various valves and pumps. More specifically, hot water control valves 112, 130 and cold water valve 156 are opened simultaneously to instantaneously provide flows of hot and cold water to the mix chamber 122. The flow rates of these two valves are in fixed proportion and controlled by pressure regulator 126. At the same time, pumps 136 and 162 pump concentrate and an aroma substance into the mix chamber and solenoid valve 142 selectively opens to allow another additive, such as sweetener, to also enter the mix chamber. The various constituents are mixed in the mix chamber and dispensed through nozzle 152. When the lever 172 is returned to its resting position, the microswitch is opened, and the microprocessor closes the flow control valves and shuts down the pumps. The operation described above instantaneously terminates the flow from the nozzle assembly 151 as soon as the lever 172 is returned to the resting position. Also, the operation of valve and pump activation and de-activation may be timed to make adjustments that could improve the homogeneity of the dispensed tea product.

FIG. 6 shows a conceptual design of exterior cladding 170 that provides the appearance of a real leaf tea brewing urn but which is actually a post-mix system according to the present invention. The exterior cladding 170 is attached to unshown support structure that mounts the individual internal elements.

The preferred use of the beverage dispensing system is to produce a brewed iced tea beverage product. The "fresh brewed" process involves the initial mixing of tea concentrate with hot water in order to "brew" the tea. Dispensing flow rates of 2.5 ounces (74 ml) per second provide the look of iced tea dispensing from a real leaf tea brewer. For 100:1 concentrate, the system uses about 0.25 ounces (7.4 ml) per second of hot water, about 2.25 ounces (66 ml) per second of cold water, and about 0.03 ounces (0.8 ml) per second of concentrate. If an additive is also used, then the amount of cold water may be reduced accordingly.

With the present invention, tea concentrate and hot water are initially mixed in the mixing chamber. The initially-mixed tea concentrate/hot water solution is then further mixed downstream in the mixing chamber assembly with a metered quantity of an aroma substance and a metered quantity of cold water to produce the finished tea beverage. The cold water reduces the temperature of the final product to a temperature that is similar in temperature to the iced tea product dispensed from leaf tea brewers. Preferably, the temperature of the dispensed tea product is within the range of 60–100° F., and more preferably within the range of 70–90° F. The dispensed tea product should be dispensed into a cup containing ice, to produce an iced tea beverage. A sweetened tea option is also provided, where a liquid sweetener (the additive) is added to the solution. The liquid sweetener may be added directly to the solution in the mixing chamber or mixed with the cold water and then with the solution.

The "fresh brewing" process results in a superior product in terms of taste, clarity, convenience and economy. There is also a distinct advantage with respect to controlling the unwanted growth of bacteria as compared to conventional leaf tea brewers where bacteria are not easily controlled.

The end user is led to believe that the product is freshly brewed iced tea from a real leaf tea brewer. Maintenance and operational costs to the end user are greatly reduced, the exterior appearance is modern and pleasant, and convenience is enhanced.

The individual components of the present invention described herein are not limited to application in beverage dispensing systems. For example, the hot water heater is useful in any application of heating a liquid.

It is preferable to use the present invention with computer hardware that performs the processing and implementing functions. As will be appreciated by those skilled in the art, the systems, methods, and procedures described herein can be embodied in or with a programmable computer, computer executable software, or digital circuitry. The software can be stored on computer readable media, for example, on a floppy disk, RAM, ROM, a hard disk, removable media, flash memory, memory sticks, optical media, magneto-optical media, CD-ROMs, etc. The digital circuitry can include integrated circuits, gate arrays, building block logic, field programmable gate arrays (FPGA), etc.

Although specific embodiments of the present invention have been described above in detail, it will be understood that this description is merely for purposes of illustration. Various modifications of the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

We claim:

1. A beverage dispensing apparatus comprising:
    a water supply;
    a concentrate supply;
    a mixing chamber for mixing water and the concentrate and dispensing the mixture;
    a pressure regulator connected to said water supply;
    a water heater connected downstream of said pressure regulator;
    a hot water inlet valve disposed in a hot water line between said pressure regulator and said mixing chamber for controlling flow of hot water to said mixing chamber;
    a hot water restriction disposed in the hot water line and having a first fixed orifice flow size;
    a cold water valve disposed in a cold water line between said pressure regulator and said mixing chamber for controlling flow of cold water to said mixing chamber;

a cold water restriction disposed in the cold water line and having a second fixed orifice flow size; and a controller for controlling said concentrate supply and said hot and cold water valves to respectively supply concentrate, hot and cold water to said mixing chamber simultaneously to form a beverage mixture of predetermined proportions, wherein said hot and cold water restrictions meter the hot and cold water at a predetermined ratio regardless of the pressure of said water supply.

2. The apparatus according to claim 1, wherein said concentrate supply comprises a concentrate source and a gear pump.

3. The apparatus according to claim 2, wherein the flow rate from said concentrate source is controlled by said controller using pulse width modulation.

4. The apparatus according to claim 1, further comprising a source of an aroma substance connected to said mixing chamber and controlled by said controller.

5. The apparatus according to claim 4, wherein the aroma substance is pumped by a pump from the source, said pump being supplied from the source and discharging through an outlet line connected to said mixing chamber, wherein a return line with a restriction is provided between said outlet line and the source.

6. The apparatus according to claim 1, wherein said water heater comprises a tank having a top, a bottom and a side wall and including a water inlet and a water outlet, said outlet provided at a top of said tank, a heating unit for heating water in said tank, a dip tube extending from said outlet into said tank to establish a headspace between the top of said tank and the water level in said tank, and a check valve communicating with the headspace to maintain the interior of said tank at no more than a predetermined maximum pressure.

7. The apparatus according to claim 1, wherein the mixing chamber comprises a chamber housing having a central bore, an outlet provided at a proximal end of said chamber housing, a hot water inlet provided at a distal end of said chamber housing and coaxial with said central bore, a cold water inlet disposed downstream of said hot water inlet and communicating with said central bore at an angle transverse to the axis of said central bore, and a concentrate inlet disposed between said hot water inlet and said cold water inlet and communicating with said central bore.

8. The apparatus according to claim 1, further comprising cladding having the appearance of a real leaf brewing urn.

9. The apparatus according to claim 1, further comprising a hot water outlet valve disposed between said water heater and said mixing chamber, said hot water outlet valve being controlled by said controller to open simultaneously with said hot water inlet valve during dispensing.

10. The apparatus according to claim 1, wherein said mixing chamber is connected to a beverage mixture outlet.

* * * * *